United States Patent
Asai et al.

[11] 3,919,142
[45] Nov. 11, 1975

[54] LIQUID POLYAMIDE EPOXY RESIN HARDENER

[75] Inventors: Schumkichiro Asai; Yasuyuki Kawakatsu, both of Wakayama, Japan

[73] Assignee: Kao Soap Co., Ltd., Tokyo, Japan

[22] Filed: Dec. 21, 1973

[21] Appl. No.: 427,081

[30] Foreign Application Priority Data
Dec. 27, 1972 Japan........................ 47-1517

[52] U.S. Cl......... 260/18 PN; 260/18 N; 260/23 R; 260/23 EP; 260/47 EP; 260/78 R; 260/78 UA; 260/830 P
[51] Int. Cl.²................................ C08G 59/44
[58] Field of Search........... 260/18 N, 18 PN, 78 R, 260/78 UA, 486 R, 23 R, 23 EP, 830 P

[56] References Cited
UNITED STATES PATENTS

| | | | |
|---|---|---|---|
| 2,174,619 | 10/1939 | Carothers | 260/78 |
| 3,282,872 | 1/1966 | Baltes et al. | 260/18 |
| 3,497,479 | 2/1970 | Cassar | 260/78 |
| 3,637,551 | 1/1972 | Sprauer | 260/18 |
| 3,647,765 | 3/1972 | Mortillaro et al. | 260/78 |
| 3,783,136 | 1/1974 | Inukai et al. | 260/486 |
| 3,803,102 | 4/1974 | Whiton | 260/18 |

FOREIGN PATENTS OR APPLICATIONS
876,450   8/1961   United Kingdom

*Primary Examiner*—Eugene C. Rzucidlo
*Attorney, Agent, or Firm*—Woodhams, Blanchard and Flynn

[57] ABSTRACT

An epoxy resin hardener consisting of polyamide resin prepared by reacting (A) dibasic acid ester of the formula,

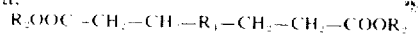

(wherein $R_1$ is a bivalent vinylidene-type olefin radical having one double bond and $R_2$ is a radical which forms an ester with acrylic acid), which dibasic acid ester is prepared from acrylic ester and vinylidene type olefin

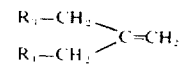

wherein $R_3$ and $R_1$ are H or alkyl having 1-19 carbon atoms), or the dibasic acid prepared by hydrolysis of said ester, or the saturated dibasic acid or ester prepared by hydrogenation of said acid or ester, with (B) polyalkylene polyamine.

9 Claims, No Drawings

LIQUID POLYAMIDE EPOXY RESIN HARDENER

BACKGROUND OF THE INVENTION

1. Field of the Invention

This invention relates to an epoxy resin hardener prepared by a condensation reaction between polyalkylene polyamine and dibasic acid ester produced by reaction of acrylic acid ester and vinylidene type olefin in the presence of an acid catalyst, or the dibasic acid prepared by hydrolysis of the ester, using polymerized fatty acid or monobasic acid as modifier, if necessary.

2. Description of the Prior Art

A known polyamide resin which has been used as an epoxy resin hardener is a viscous liquid prepared by reacting polymerized fatty acid with an aliphatic polyamine. A modifier such as a monobasic acid, can be employed if necessary. This prior art polyamide hardener for epoxy resins has the advantages that it can be used for hardening at room temperature, it produces flexible products, it is less toxic, and it has a long pot-life. But it also has significant disadvantages. For instance, the hardened product is unsatisfactory in acid resistance and solvent resistance and also has insufficient adhesion strength.

SUMMARY OF THE INVENTION

We have discovered that a novel polyamide resin having improved properties as an epoxy resin hardener, can be prepared by replacing part or all, that is, 100-50 mole % of the polymerized fatty acid such as dimeric acids having 32 to 44 carbon atoms, conventionally used to make polyamide resin useful as epoxy resin hardener, with a special dibasic acid ester which is a reaction product of acrylic acid ester and vinylidene type olefin, or the dibasic acid obtained by hydrolysis of the corresponding ester or the corresponding saturated acid or ester compounds.

The dibasic acid compound employed as a starting reactant for preparing the polyamides, according to the invention, has the formula

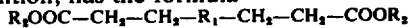

$$R_2OOC-CH_2-CH_2-R_1-CH_2-CH_2-COOR_2 \quad I$$

wherein $R_1$ is a bivalent hydrocarbon radical of the formula

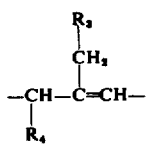

or

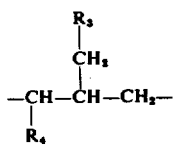

(in these formulas, the double bond may be moved to a position other than those illustrated therein) wherein $R_3$ and $R_4$, which can be the same or different, are H or alkyl having 1 to 19 carbon atoms, $R_2$ is H or a radical which forms an ester with acrylic acid.

The dibasic acid compound employed in this invention, Formula I, thus includes both unsaturated esters and acids and saturated esters and acids. The unsaturated dibasic acid ester is prepared first. If desired, it can be converted to the corresponding acid and to the corresponding saturated ester or acid by conventional hydrolysis and hydrogenation procedures or combinations of such procedures.

The ester moiety $R_2$, when $R_2$ is a radical which forms an ester with acrylic acid, is not critical and it can be derived from compounds which are reactive with acrylic acid to form acrylic acid esters. It is preferred, however, that $R_2$ is selected from the group consisting of alkyl having 1 to 8 carbon atoms such as methyl, ethyl, propyl and butyl, alkenyl having 2 to 8 carbon atoms, such as allyl, cycloalkyl having 3 to 8 carbon atoms, such as cyclohexyl, cycloalkenyl having 3 to 8 carbon atoms, and aryl and aralkyl having up to 8 carbon atoms such as benzyl. It is especially preferred that $R_2$ is methyl.

It is preferred that one of $R_3$ and $R_4$ is H and the other

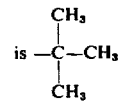

The starting dibasic acid ester of Formula I, wherein $R_2$ is an ester moiety, used in this invention is prepared as follows: 0.1 to 2 mols of vinylidene type olefin such as diisobutylene and 1 mol of acrylic acid ester are heated to react in the presence of an acid catalyst such as aluminum chloride. The catalyst is removed by a conventional process such as water-washing. There is obtained a mixture containing two reaction products, in which the molar ratios of the acrylic acid ester moiety: vinylidene type olefin moiety are 1:1 and 2:1, respectively. From the reaction product mixture, the 1:1 reaction product (monobasic ester) is distilled off under reduced pressure to obtain the desired dibasic acid ester starting material. This dibasic acid ester has the following general formula:

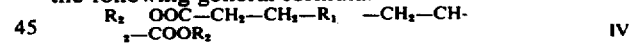

$$R_2\ OOC-CH_2-CH_2-R_1\ -CH_2-CH_2-COOR_2 \quad IV$$

wherein $R_1$ is a vinylidene type olefin radical of Formula II having one double bond, and $R_2$ is the same as $R_2$ except that it does not include hydrogen.

The vinylidene type olefin employed in the above-mentioned reaction is a compound of the formula,

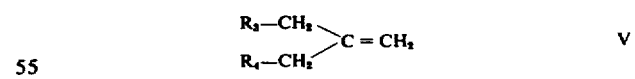

$$\begin{matrix}R_3-CH_2\\R_4-CH_2\end{matrix}\!\!>\!\!C=CH_2 \quad V$$

wherein $R_3$ and $R_4$ are as defined above. The preparation of such starting dibasic acid ester is disclosed in the pending U.S. patent application Ser. No. 298,389, now abandoned of Ueda et al.

In the present invention, in the polyamidation reaction described below, in addition to the above-described dibasic acid ester there can be used the corresponding dibasic acid prepared by conventional hydrolysis of said dibasic acid ester, or the corresponding saturated dibasic acid or its ester prepared by a conventional hydrogenation of the double bond of $R_1$ in the formula IV dibasic acid ester.

For producing an epoxy resin hardener consisting of polyamide resin, according to this invention, a conventional polyamidation reaction can be employed in accordance with known procedures. The reaction temperature is from 110° to 350°C, preferably from 170° to 280°C and the reaction time is from 1 to 10 hours. An acidic catalyst, such as the conventional phosphoric acid catalyst, can be used during the reaction, but the reaction can be performed without using a catalyst. It is preferred to perform the polyamidation reaction in an inert gas atmosphere such as nitrogen gas to prevent coloring of the reaction product. If desired, the reaction can be carried out under reduced pressure for accelerating the reaction.

As the polyamine to be used as a reactant in the polyamidation reaction, there are used aliphatic polyalkylene polyamines of the formula $H_2N(CH_2CH_2NH)_nH$ wherein $n$ is an integer of from 1 to 5. Ethylenediamine, diethylenetriamine, triethylenetetramine and tetraethylene pentamine are preferred. It is also acceptable to use in combination with said aliphatic polyalkylene polyamines, up to 50% by weight, based on the total weight of polyamines, of aromatic polyamines such as phenylene diamine and xylylene diamine and alicyclic polyamines such as cyclohexane diamine and isophorone diamine to modify the properties of the polyamide resin product.

For controlling the molecular weight of the polyamide resin product of this invention, a monobasic acid can be used in the polyamidation reaction, if necessary. As the monobasic acid, there can be used any fatty acid of saturated, unsaturated, long-chain and branched type, such as fatty acids RCOOH in which R is an aliphatic hydrocarbon radical having 9 to 23 carbon atoms and mixtures thereof. Particularly fatty acids and mixtures thereof occurring in oils of natural products such as fatty acids of soybean oil, cottonseed oil or rape seed oil are preferred. Of course, there can also be used aromatic acids such as benzoic acid and salicyclic acid, alicyclic acids such as cyclohexane carboxylic acid, and naphthenic acid, and oxy acids such as castor oil fatty acid and hydroxystearic acid, and mixtures thereof.

In producing the polyamide resin of this invention, the ratio of carboxyl equivalent to amine equivalent of the reactants is not particularly limited as long as gelation is avoided. In general a ratio of carboxyl equivalent:amine equivalent in the range of from 1:1.2 to 1:5 is preferred.

In producing the polyamide resin of this invention, the ratio of dibasic acid and monobasic acid in the reactant mixture can be optionally selected depending on the desired molecular weight of the polyamide resin product. However, it is preferable to use monobasic acid in an amount of less than 2 equivalents, more preferably less than 1 equivalent, per 1 equivalent of dibasic acid. The polyamide resin of the present invention has a molecular weight of 400 to 2,000. If the molecular weight is larger than 2,000 the resin will be a solid and not suitable as a hardener for epoxy resins.

The polyamide resin product according to this invention can be employed as a hardener for epoxy resins in accordance with conventional practice. As is well known, the epoxy resins are polyepoxides possessing more than one vicepoxy group, i.e., more than one

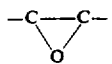

groups. The polyepoxides can be saturated or unsaturated, aliphatic, cycloaliphatic, aromatic or heterocyclic and can be substituted if desired with substituents, such as chlorine atoms, hydroxyl groups, ether radicals and the like. They can also be monomeric or polymeric.

The polyepoxide compounds to be used in the present invention include diglycidyl ethers of bisphenol A, dicyclopentadiene dioxide, diglycidyl ethers of dimer alcohols and the like. Among such polyepoxides, the most preferred are diglycidyl ethers of bisphenol A obtained by reacting 2,2-bis(4-hydroxyphenyl)-propane with epichlorohydrin in an alkaline medium, which have already been placed on the market as a typical polyepoxide.

Typical commercially available epoxy resins are Epicoat 815, 828 and 834 (all liquids) and Epicoat 1001 and 1004 (solids), all of which are products of Shell Oil Company. Other glycidyl epoxy resins can of course be employed.

The amount of polyepoxide and hardener in the composition can vary depending on the properties desired in the resulting products. The polyepoxide and hardener are combined in a weight ratio in the range of 10:1 to 1:10. It is preferred to employ a weight ratio of polyepoxide:hardener in the range of from 1:2 to 1:0.1.

Usual modifiers, such as extenders, fillers, reinforcing agents, color agents, organic solvents, plasticizers and the like can be present in the curable composition.

The invention is further described by reference to the following illustrative, non-limiting Examples.

EXAMPLES 1 TO 9 AND COMPARISON EXAMPLES 1 AND 2

73 Kg. of methyl acrylate, 42 kg. of diisobutylene, and 7.3 kg. of aluminum chloride, as a catalyst, were placed in a glass-lined vessel provided with a stirrer, a thermostat and a reflux condenser, and they were reacted at the reflux temperature for 15 hours. The reaction mixture was neutralized with caustic soda aqueous solution. Then the unreacted methyl acrylate and water were distilled off under reduced pressure. Then, 33.2 kg. of 25% sulfuric acid aqueous solution were added to convert the aluminum chloride to aluminum sulfate, and the mixture was water-washed to remove the catalyst until the washings became neutral. There was obtained 100 kg. of crude dibasic acid methyl ester. From the crude dibasic acid methyl ester, 18.5 kg. of the by-produced monobasic acid methyl ester were distilled off under reduced pressure and there was obtained 81.5 kg. of purified dibasic acid methyl ester (acid value, 21.3:saponification value, 387.3: iodine value, 79.6).

This dibasic acid methyl ester is a mixture of the compound of the formula of

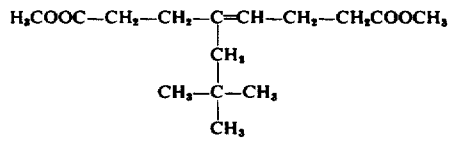

and the compound of the formula of

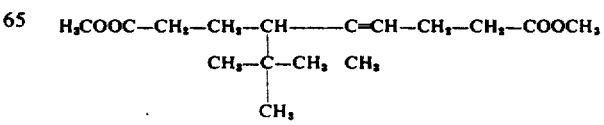

in a ratio of about 1:1

The thus-obtained dibasic acid methyl ester, oleic acid, and polyamine were charged into a reactor provided with a stirrer, a thermostat, a cooling dehydrating tube and a nitrogen blower, and then, were heated up gradually to 220°C during which time water and methanol were distilled off. After reacting the materials at a temperature of 220°C for 2 hours, the temperature was further elevated from 220° to 270°C, the reaction was continued at the latter temperature for 4 hours, and after cooling, a polyamide resin was obtained. For comparison, polyamide resins were similarly produced employing polymerized fatty acid instead of dibasic acid methyl ester as in Examples 1 to 9.

The following Table I shows the reactants for the various syntheses and the properties of the resulting polyamides.

was hydrogenated in an autoclave with a palladium-carbon catalyst to produce saturated dibasic acid methyl ester (saponification value, 416.5; iodine value, 0.7). With the resulting ester, the reaction was carried out by the same process as in Examples 1–9. The following Table II shows the reactants for the syntheses and the properties of the resultant polyamides.

EXAMPLE 12

An epoxy resin (Epicoat 828, a trademark of Shell Co.) was hardened with the hardeners of polyamide resins which were prepared in Examples 1–11 and Comparison Example 1–2. The chemical resistance and the adhesion strength of the hardened resin were tested. In the test, 100 parts of the epoxy resin and the hardener shown in the following table were well mixed in a breaker. the mixture was applied to a glass plate for the chemical resistance test and to an aluminum plate for the adhesion test, and were tested under the conditions shown below. The results were as follows:

Table II

| Example | Saturated dibasic acid methyl ester | Monobasic acid methyl ester by-product | Triethylene-tetramine | Properties of Polyamide | |
|---|---|---|---|---|---|
| | | | | Total amine value | Viscosity, c.p. (40°C) |
| 10 | 2000g | — | 1168g | 316 | 18600 |
| 11 | 2000g | 400g | 118g | 209 | 36500 |

EXAMPLES 10–11

The dibasic acid methyl ester used in Examples 1–9

Table 1

| Example | Dibasic Acid Methyl Ester | Oleic acid* | Polyamine | | Properties of Polyamide | |
|---|---|---|---|---|---|---|
| | | | | | Total amine value | Viscosity, 25°C, c.p. |
| 1 | 721 g | 1395 g | Triethylenetetramine | 1267 g | 400 | 792 |
| 2 | 721 | 1395 | Triethylenetetramine | 852 | 244 | 8500 |
| 3 | 1441 | 698 | Triethylenetetramine | 1174 | 322 | 19800 |
| 4 | 721 | 1395 | Diethylenetriamine | 1071 | 325 | 860 |
| 5 | 1441 | 698 | Diethylenetriamine | 844 | 245 | 10400 |
| 6 | 1441 | 1395 | Diethylenetriamine | 941 | 198 | 19000 |
| 7 | 1441 | 1395 | Tetraethylene pentamine | 1938 | 410 | 9800 |
| 8 | 721 | 1395 | Tetraethylene pentamine | 1201 | 350 | 3600 |
| 9 | 2000 | — | Triethylenetetramine | 967 | 250 | 97800 |
| Comparison Example | Polymerized fatty acid** | Oleic acid | Polyamine | | Total amine value | Viscosity, 25°C, c.p. |
| 1 | 1087 g | 337 | Triethylenetetramine | 771 | 330 | 8400 |
| 2 | 1440 | — | Tetraethylene pentamine | 756 | 300 | 70000 |

*Industrial oleic acid having an acid value of 200.4, a saponification value of 201.0 and an iodine value of 87.2.
**Empole 1022 of Emery Co. (acid value, 194.8; saponification value, 196.0; iodine value, 99.1)

Table III

| Polyamide resin | Amount of polyamide resin added per 100 parts of Epicoat 828 | Chemical resistance | | Adhesion, kg/cm² |
|---|---|---|---|---|
| | | Acid | Solvent | |
| Example 1 | 45 parts | Unchanged | Unchanged | 122 |
| " 2 | 90 parts | Unchanged | Unchanged | 135 |
| " 3 | 60 parts | Unchanged | Unchanged | 137 |
| " 4 | 60 parts | Unchanged | Unchanged | 148 |
| " 5 | 90 parts | Unchanged | Unchanged | 165 |
| " 6 | 110 parts | Unchanged | Unchanged | 170 |
| " 7 | 40 parts | Unchanged | Unchanged | 158 |
| " 8 | 60 parts | Unchanged | Unchanged | 169 |
| " 9 | 60 parts | Unchanged | Unchanged | 176 |
| " 10 | 60 parts | Unchanged | Unchanged | 151 |
| " 11 | 60 parts | Unchanged | Unchanged | 164 |
| Comparison Example 1 | 60 parts | Changed to brown | Swollen | 96 |
| 2 | 60 parts | Changed to brown and a little swollen | Swollen | 104 |

Chemical resistance test:
  Application conditions: applied to a glass plate with an applicator to form a layer of 50μ thickness.
  Hardening conditions: 1 day at room temperature
                        1 day at 70°C
  Immersing time: 7 days at room temperature
  Acid resistance: 50% sulfuric acid aqueous solution
  Solvent resistance: toluene
Adhesion test:
  Testing method: ASTM D-1002
  Hardening conditions: 2 days at room temperature
                        1 day at 70°C The embodiments of the invention in which an exclusive property or privilege is claimed are defined as follows:

1. A liquid polyamide resin, useful as an epoxy resin hardener, consisting essentially of the reaction product of a carboxylic acid or ester reactant and a polyamine reactant, reacted at a ratio of carboxyl equivalents to amine equivalents of from 1:1.2 to 1:5.0, at 110° to 350°C, for from 1 to 10 hours, said reaction product having a molecular weight of from 400 to 2000, said carboxylic acid or ester reactant consisting essentially of A. a dibasic component consisting of
   1. up to 50 mole % of dimer acid having 32 to 44 carbon atoms, and
   2. the balance is a compound or mixture of compounds having the formula
      $R_2OOC-CH_2-CH_2-R_1-CH_2-CH_2-COOR_2$
wherein $R_1$ has the formula

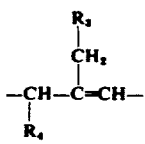

or

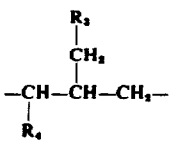

wherein $R_3$ and $R_4$, which can be the same or different, are hydrogen or alkyl having 1 to 19 carbon atoms and $R_2$ is hydrogen or a radical which forms an ester with acrylic acid, B. from zero to less than 2 equivalents, per one equivalent of the dibasic component A, of a monobasic acid capable of controlling the molecular weight of the polyamide product;

said polyamine reactant consisting essentially of
   3. up to 50% by weight of a polyamine selected from the group consisting of aromatic polyamines and alicyclic polyamines, and
   4. the balance is polyalkylene polyamine having the formula $H_2N(CH_2CH_2NH)_nH$, wherein $n$ is an integer of from 1 to 5.

2. A polyamide resin according to claim 1, in which one of $R_3$ and $R_4$ is hydrogen and the other thereof is $-C(CH_3)_3$.

3. A polyamide resin according to claim 2, in which said polyalkylene polyamine is selected from the group consisting of diethylenetriamine, triethylenetetramine and tetraethylenepentamine.

4. A polyamide resin according to claim 3, in which said monobasic acid is a fatty acid or mixture of fatty acids having from 10 to 24 carbon atoms.

5. A polyamide resin according to claim 4, in which said dibasic component consists of A(2), and said polyamine component consists of said polyalkylene polyamine.

6. A cured epoxy resin composition obtained by reacting (a) a 1,2-polyepoxide compound having on the average more than one 1,2-epoxide group in the molecule, with (b) a polyamide as claimed in claim 1, as a curing agent, the weight ratio of (a) to (b) being in the range of from 10:1 to 1:10.

7. A composition according to claim 6, in which the weight ratio of (a) or (b) is from 1:2 to 1:0.1.

8. A process of curing a 1,2-polyepoxide compound having on the average more than one 1,2-epoxide group in the molecule, which comprises, incorporating in said 1,2-polyepoxide compound, a polyamide as claimed in claim 1, as a curing agent, the weight ratio of said 1,2-polyepoxide compound to said polyamide being from 10:1 to 1:10.

9. A process as claimed in claim 8 in which the weight ratio of said 1,2-polyepoxide compound to said polyamide is from 1:2 to 1:0.1.

* * * * *